US009023216B2

(12) United States Patent
Kochergin et al.

(10) Patent No.: US 9,023,216 B2
(45) Date of Patent: May 5, 2015

(54) DEVICE FOR TURBULENCE REDUCTION

(75) Inventors: Vadim Kochergin, Baton Rouge, LA (US); Cy Gaudet, St. Martinville, LA (US)

(73) Assignee: Board of Supervisors of Louisiana State University and Agricultural and Mechchanical College, Baton Rouge, LA (US)

( * ) Notice: Subject to any disclaimer, the term of this patent is extended or adjusted under 35 U.S.C. 154(b) by 389 days.

(21) Appl. No.: 13/203,290

(22) PCT Filed: Sep. 20, 2010

(86) PCT No.: PCT/US2010/049450
§ 371 (c)(1),
(2), (4) Date: Feb. 27, 2012

(87) PCT Pub. No.: WO2011/037851
PCT Pub. Date: Mar. 31, 2011

(65) Prior Publication Data
US 2012/0168389 A1    Jul. 5, 2012

Related U.S. Application Data

(60) Provisional application No. 61/244,947, filed on Sep. 23, 2009.

(51) Int. Cl.
*B01D 21/24*   (2006.01)
*C13B 20/16*   (2011.01)
*B01D 21/00*   (2006.01)

(52) U.S. Cl.
CPC ............ *B01D 21/0087* (2013.01); *C13B 20/16* (2013.01); *B01D 21/2416* (2013.01); *B01D 21/2427* (2013.01)

(58) Field of Classification Search
CPC ........... B01D 21/0042; B01D 21/0087; B01D 21/2405; B01D 21/2416; B01D 21/2427; C13B 20/16
USPC .............. 210/800, 801, 519, 521, 532.1, 541; 127/24, 27, 57
See application file for complete search history.

(56) References Cited

U.S. PATENT DOCUMENTS 1,262,076 A * 4/1918 Marston ......................... 210/519
2,470,076 A   5/1949 Warren et al. ................... 127/57
(Continued)

FOREIGN PATENT DOCUMENTS

RU    02094084    10/1997
SU    00990817    1/1983
SU    01816473    5/1993

OTHER PUBLICATIONS

Kochergin, V., "A Juice Clarifier with Turbulence Reduction Devices: Results of First Industrial Trials," *Proc S Afr Sug Technol. Assoc*, 83rd Annual Congress, Durban, South Africa (Aug. 25-27, 2010).
(Continued)

*Primary Examiner* — Christopher Upton
(74) *Attorney, Agent, or Firm* — John H. Runnels

(57) ABSTRACT

Apparatus is disclosed for substantially reducing the momentum, velocity, or both of a first liquid that is flowing into a second liquid. The device allows one to substantially reduce or even eliminate large-scale turbulent eddies that could otherwise be produced by liquid flowing into or within a vessel, for example in a clarifier. Suitably-sized and positioned plates and baffles induce changes of flow direction in a limited volume. By the time the fluid leaves this volume, the fluid velocity is low, and turbulence is nearly or entirely eliminated. Several of the devices may be placed at different inputs within a single clarifier, and thus increase efficiency further.

16 Claims, 1 Drawing Sheet

(56) References Cited

U.S. PATENT DOCUMENTS

| | | | | |
|---|---|---|---|---|
| 2,488,851 A | | 11/1949 | Copp | 210/55 |
| 2,611,685 A | | 9/1952 | Yoder | 23/288 |
| 3,556,736 A | | 1/1971 | Boyd | 23/288 |
| 4,014,786 A | * | 3/1977 | Potter et al. | 210/519 |
| 4,479,875 A | | 10/1984 | Nelson | 210/519 |
| 4,609,010 A | | 9/1986 | Watson | 137/587 |
| 4,780,206 A | | 10/1988 | Beard et al. | 210/521 |
| 5,192,465 A | | 3/1993 | Petrich et al. | 261/97 |
| 5,204,000 A | * | 4/1993 | Steadman et al. | 210/519 |
| 5,354,460 A | | 10/1994 | Kearney et al. | 210/198.2 |
| 5,378,378 A | | 1/1995 | Meurer | 210/788 |
| 5,833,865 A | * | 11/1998 | Harato et al. | 210/801 |
| 5,893,970 A | * | 4/1999 | Wood et al. | 210/519 |
| 5,938,333 A | | 8/1999 | Kearney | 366/336 |
| 5,944,995 A | | 8/1999 | Sethi et al. | 210/519 |
| 6,276,537 B1 | * | 8/2001 | Esler et al. | 210/519 |
| 6,800,209 B2 | | 10/2004 | Wright | 210/801 |
| 2003/0136730 A1 | * | 7/2003 | Schneider et al. | 210/519 |
| 2005/0252868 A1 | | 11/2005 | Albertson | 210/800 |
| 2006/0278578 A1 | * | 12/2006 | Dornfeld | 210/513 |
| 2007/0209996 A1 | * | 9/2007 | Zhou | 210/519 |

OTHER PUBLICATIONS

Kochergin, V. et al., "Experience with new design of juice clarifier," ASSCT LA division, Lafayette, LA (Feb. 2-3, 2010).

Kochergin, V. et al., "New Approach to Fluid Distribution in the Industrial Clarifiers," 40th Joint Annual meeting of ASSCT Florida and Louisiana Divisions, Panama City Beach (Jun. 16-18, 2010).

Scott, R.P., "Modifications to and Experiences with RAPIDORR Clarifiers Including Saccharate Liming at Amatikulu," *Proc S Afr Sug Technol. Assoc.*, vol. 62, pp. 32-35 (Jun. 1988).

Steindl, R.J. et al., "Recent developments in clarifier design," *Aust. Soc. Sugar Cane Technol.*, vol. 20, pp. 477-483 (1998).

\* cited by examiner

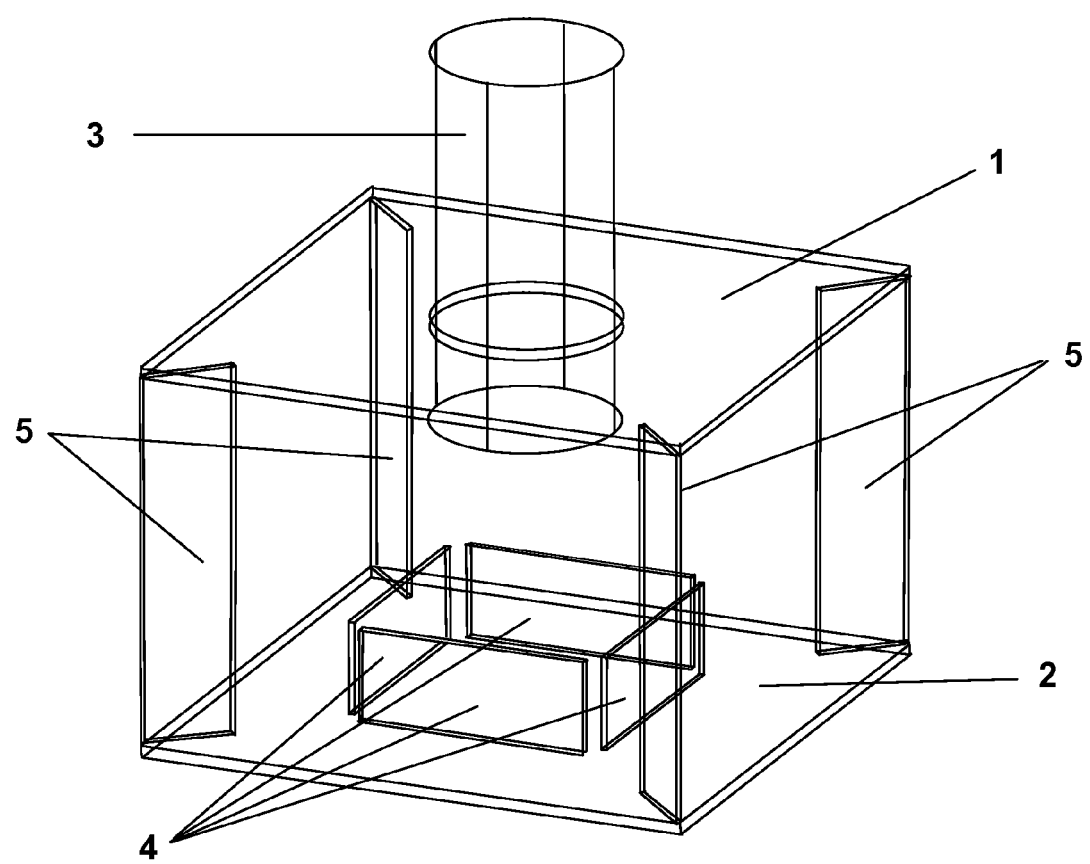

DEVICE FOR TURBULENCE REDUCTION

This is the United States national stage of international application PCT/US2010/049450, international filing date Sep. 20, 2010, which claims the benefit of the Sep. 23, 2009 filing date of U.S. provisional patent application Ser. No. 61/244,947 under 35 U.S.C. §119(e).

TECHNICAL FIELD

This invention pertains to an apparatus for reducing the momentum, velocity, or both of a turbulent liquid, for example in a clarifier.

BACKGROUND ART

"Clarification" is the settling or removal of suspended solids from a liquid, for example in municipal water treatment, the treatment of sugar cane juice, or the manufacture of pulp and paper. Existing clarifier designs have the general disadvantage that large, turbulent eddies are created as liquid flows into the tanks. The turbulence results in inefficient use of the settling area, reduced quality of the liquid overflow, and generally imposes longer residence times than would otherwise be needed. A longer residence time is inherently less efficient and more expensive, especially where perishable or degradable products are involved. For example, in the clarifying sugar juice, a longer residence time can result in partial product deterioration.

Clarification of sugar cane juice is an important part of the milling process. A standard design employs a cylindrical tank with a sloped base, with or without a raking mechanism to remove sludge. Clarified liquid is removed through overflow launders, typically positioned on the periphery of the tank. Alternatively, in a rectangular device, the feed inlet is located on the side opposite from the overflow launder. Some clarifiers include a central well for dispersing flocculants. In most conventional clarifiers, liquid travels horizontally outwards and vertically upward, following a path from the central feed well to overflow outlets or launders (the so-called Dorr design), or from the periphery to a central outlet (the so-called Graver design). The horizontal flow reduces efficiency and throughput: It creates a large-scale, circular motion inside the clarifier, which decreases performance and separation efficiency. A separation that takes only a few minutes on a small scale can take from 30 minutes to several hours in a mill due to the effects of turbulence on settling time.

Both computer modeling and experimental visualization have demonstrated that most existing clarifier designs are inefficient, and are subject to large-scale turbulence. These inefficiencies lead to increased production costs, lower quality output, or both.

Some prior clarifier designs have employed multiple plates to increase settling area and to reduce eddies, but these designs have typically been too expensive and complex for widespread commercial use.

In other prior designs the inlet flow enters the clarifier either through distribution trays or feed launders that provide a large surface area to slow fluid flow. Even so, large-scale eddies can still be created in these devices due to the large mass of flow entering the clarifier. Other design alternatives have not been widely accepted in the sugar industry.

Some recent clarifier designs are more efficient, with reduced residence times. However, these newer designs are more expensive; their installation would require most mills to purchase new equipment or to pay for costly re-engineering. Also the hydrodynamic conditions in the new designs, while somewhat improved, are not much different from those in conventional designs. They typically produce lateral flows that can create large eddies that interfere with settling.

A "lamella" type clarifier uses a stack of parallel, inclined plates within a rectangular vessel to shorten sedimentation pathways. Significant additional surface area is provided for settling, and the travel distance for liquid is reduced. Significant issues for a lamella clarifier include the removal of solids and cleaning of the lamellae. The cost for a lamella clarifier can be significant, especially if it is constructed from a non-polymeric material. (Polymers can be difficult to use with high temperature sugar solutions.)

U.S. Pat. No. 2,488,851 discloses a sugar juice clarifier with a plurality of superposed settling trays.

U.S. Pat. No. 2,470,076 discloses a so-called "Dorr" clarifier, similar to those that are commonly used in sugar mills today.

U.S. Pat. No. 2,611,685 discloses a reaction vessel for contacting vapors with fluidized, finely divided particles. A series of truncated, concentric cones is arranged in the bottom of the vessel to achieve even fluid distribution across the diameter of the reactor.

U.S. Pat. No. 4,609,010 discloses a fluid distribution system that employs a series of perforations in a fluid inlet distributor.

U.S. Pat. No. 5,192,465 discloses a distributor assembly comprising a distributor plate adapted for horizontal positioning and securement to a process column liquid distributor for the symmetrical discharge of liquid therefrom. The distributor plate comprises a member having side walls formed therearound and a plurality of apertures formed therein. The distributor plate is constructed for collecting liquid discharged from the liquid distributor, spreading the liquid thereacross and affording low velocity equal discharge of liquid therefrom into a packing bed therebeneath.

U.S. Pat. No. 3,556,736 discloses an apparatus for contacting two fluids in a fluid-solids contact zone.

U.S. Pat. No. 4,479,875 discloses an inlet distributor for liquid-liquid separators, in which fluid passes through a packing means to provide a pressure drop.

U.S. Pat. No. 4,780,206 discloses a turbulence control system comprising a first baffle, fixedly connected across the interior of an intra-channel clarifier having side walls between the side walls near the point of entry of wastewater into the clarifier, the first baffle covering a desired portion of the cross-sectional flow area within the clarifier; and a second baffle, fixedly connected across the interior of the clarifier between the side walls downstream of the first baffle and covering a desired portion of the cross-sectional flow area left uncovered by the first baffle. The turbulence control system may also comprise at least one accumulation baffle, connected between the side walls and near the bottom of the clarifier, the accumulation baffle extending upward to a desired height within the clarifier, but not so high as to produce a flow velocity that would impede settlement of sludge within the clarifier.

U.S. Pat. No. 5,378,378 discloses the use of helical inlet flow to reduce the energy of liquid and solids flowing in a basin toward a clarifier.

U.S. Pat. No. 5,354,460 discloses a step-down nozzle for the even distribution of fluids at the interface between phases in a column or cell accommodating a plug flow operation structured with an internal flow channel of recursive configuration.

Scott, R. P. (1988). Modification to and experiences with RAPIDORR clarifiers including saccharate liming at Amatikulu. *Proc S Afr Sug Technol. Assoc.* 62: 32-35 discloses a Dorr-type clarifier, which introduces feed through a hollow rotating pipe in the center of the clarifier. This device distributes the feed into several compartments within the clarifier, in each of which the flow is deflected by a baffle.

Steindl, R. J., Fitzmaurice, A. L. and Alman, C. W. (1998). Recent developments in clarifier design. *Aust. Soc. Sugar Cane Technol.*, 20: 477-483 discloses the use of a single-point feed system to produce a constant velocity in the feed launder, and a uniform distribution of feed around the circumference of the feed well.

U.S. Pat. No. 5,938,333 discloses a fractal design to provide "geometric" control over flow to reduce turbulence.

U.S. Pat. No. 5,944,995 discloses a clarifier in which the feed well diameter increases from top to bottom in a conical shape to decrease the fluid velocity. It also incorporates baffles for added velocity reduction. The base of the feed well includes a downwardly and inwardly angled rim to further reduce velocity.

U.S. Pat. No. 6,800,209 discloses a device that incorporates equally-spaced ports around the circumference. Each port includes baffles that direct the feed stream tangentially, in opposite directions. Energy is dissipated when fluids from adjacent ports collide.

Prior work by the inventors has been presented as: V. Kochergin, C. Gaudet, M. Robert, S. Bergeron—Experience with new design of juice clarifier, ASSCT LA division, Lafayette, La. Feb. 2-3, 2010; and largely cumulative is the following presentation: V. Kochergin, and C. Gaudet, New Approach to Fluid Distribution in the Industrial Clarifiers— 40th Joint Annual meeting of ASSCT Florida and Louisiana Divisions, Panama City Beach, Jun. 16-18, 2010. See also V. Kochergin, "A Juice Clarifier with Turbulence Reduction Devices," Proceedings of South African Sugar Technologists' Association 83rd Annual Congress, Aug. 25-27, 2010, Durban, South Africa.

DISCLOSURE OF THE INVENTION

We have discovered a novel device for substantially reducing the momentum, velocity, or both of a first liquid that is flowing into a second liquid. The device allows one to substantially reduce or even eliminate large-scale turbulent eddies that could otherwise be produced by liquid flowing into or within a vessel. The invention employs a simple design, improves separation efficiencies, and requires only short residence times. The equipment footprint may be small. The invention is economical to employ, and it may readily be retrofitted onto existing equipment.

The direction of flow makes substantial changes several times after the fluid exits an inlet pipe or hose. Suitably-sized and positioned plates and baffles induce changes of flow direction. By the time the fluid leaves the interior of the device, the fluid velocity and momentum are both very low, and turbulence is nearly or entirely eliminated. In some cases, we have reduced flow velocity by a factor of ~50. The novel device is simple to manufacture, to operate, and to clean.

Several of the devices may be placed simultaneously at different locations within a single clarifier, and thus increase efficiency further. The several devices are preferably uniformly distributed, and are preferably connected to a common header or input.

In one embodiment, the device comprises two parallel plates held at a set distance from one another—for example, connected to one another by spacers. A first liquid enters through a pipe or hose through an opening in the first plate (usually the upper plate) and impinges on the second plate (the deflection plate, usually the lower plate). The first and second plates have approximately the same area, and that area is substantially larger than the cross-section of the inlet in the first plate through which the first liquid originally flows. The second (deflection) plate diverts the direction of the first liquid flow by approximately 90 degrees. The second (deflection) plate also changes the flow from being more-or-less linear—all the first liquid moving in approximately the same direction—to a radial flow outward, more-or-less perpendicular to the original direction of flow, and more-or-less parallel in all directions to the second plate.

Adjacent to, and preferably affixed to the second plate are at least four deflection baffles, each of which is more-or-less perpendicular to the second plate, is more-or-less parallel to original direction of flow, and is more-or-less perpendicular to the local direction of the outward radial flow induced by the second plate. The baffles may be arranged in various configurations, e.g., a square, a hexagon, or a generally circular configuration. The baffles further divert the outward radial flow through a direction between about 90 degrees and about 180 degrees. (It is preferred to have spaces between adjacent baffles, as such spaces help inhibit the formation of vortices.) The combined effect of the second (deflection) plate and the baffles dissipates most of the energy of the flow within the space between the two parallel plates. Turbulent eddies are substantially reduced or even eliminated. Velocity and momentum of the fluid flow are greatly reduced—by a factor of 40, 50, or even higher. The device allows fluid to be introduced into a second liquid in vessel in a non-turbulent manner, at substantially higher rates than would otherwise be possible. (The first and second liquids may be the same or different.)

One use of the novel device is within a clarifier, to remove suspended solid particles from a liquid. Clarifiers are used, for example, in water treatment plants, and in processing sugar cane juice or sugar beet juice. Using the novel turbulence reduction device, the residence time for industrial-scale clarification of sugar juice can be as rapid as ~30 minutes, substantially faster than has been possible with prior designs. Optionally, within a single vessel there may be multiple fluid inlets, with each inlet provided with a separate turbulence reduction device in accordance with the present invention.

BRIEF DESCRIPTION OF THE DRAWING

The FIGURE illustrates schematically a prototype embodiment of the invention.

MODES FOR PRACTICING THE INVENTION

Example 1

The FIGURE schematically depicts a prototype embodiment of the invention that has been successfully built and tested. This embodiment comprised two parallel, horizontal plates 1 and 2, with a feed pipe 3 extending vertically and perpendicularly through an opening in upper plate 1. The degree of turbulence was reduced substantially as lower plate 2 changed the flow direction and dissipated the energy of an impinging liquid jet. Baffles 4 further deflected the fluid flow, further dissipating energy. Spacers 5 held plates 1 and 2 in a fixed position relative to one another. Spacers 5 may also, depending on their configuration, secondarily dissipate additional energy from the fluid flow, although these effects are generally minimal because most of the energy has been dissipated before the liquid flow encounters the spacers.

Alternatively, the feed pipe may be positioned horizontally, parallel to the horizontal plates, for example if available space in a retrofit operation does not permit a vertical entry. The inlet pipe should have an opening corresponding with the opening in the upper plate of the device. For example, a piece of guide pipe welded to the inlet can direct the flow jet to enter the space between the plates in a direction perpendicular to the lower plate.

In the prototype embodiment H, the distance between the parallel first and second plates, was 8 inches (20 cm). L, the length of the two plates, was 12 inches (30 cm). D, the distance between opposing baffles, was 5 inches (13 cm). Liquid entered through a pipe that passed through a circular opening in the center of the first plate. Deflection baffles were affixed to the second plate. The height of the deflection baffles, h, was 1.5 inches (4 cm). The deflection baffles were placed in a more-or-less square configuration, with spaces between adjacent baffles. The inlet pipe diameter, d, was 3 inches (8 cm) Flow rates tested varied from 0 to about 110 gallons per minute (25 m$^3$/hr).

Example 2

Testing of the prototype embodiment of Example 1, using dye in water, confirmed the non-turbulent dispersal of inflowing liquid into the tank, and in particular has confirmed that turbulence is reduced very substantially as compared to that seen from conventional flow from a simple pipe into a tank, without any turbulence reduction device. Water with dye was pumped through an 8 cm diameter hose at a rate of 23 m$^3$/h into a tank (volume ~1 m$^3$) containing water without dye. The test was repeated both with and without the prototype device attached to the end of the hose. Visualization of the resulting flow pattern showed substantial turbulence when the hose was used alone. In sharp contrast, there was almost a complete lack turbulence when the prototype device was attached to the hose. The surface of the water remained calm, despite the discharged of liquid at a rate of 23 m$^3$/h only ~40 cm below the surface.

The novel device practically eliminated the horizontal component of liquid flow that can otherwise cause large turbulence eddies. The new design caused the flow to approach an ideal pattern, in which the separation of solid particles from the liquid was determined simply by the arithmetic difference between the particle settling velocity and the upward flow rate. Large-scale eddies that could interfere with separation and clarification were virtually eliminated.

Example 3

The novel device has been successfully implemented and tested in an industrial setting. An existing Graver clarifier in a Louisiana sugar mill was retrofitted with novel turbulence reduction devices in accordance with the present invention. The clarifier had a diameter of 6 m and a height of 7.5 m, including the conical bottom portion. The conventional trays were removed from the Graver clarifier, and overflow collection launders were installed and carefully leveled. Nine turbulence reduction devices, each generally similar to the device of Example 1, were positioned uniformly about 1.5 m above the bottom of the tank. A pre-distributor piping system divided the incoming liquid evenly among the nine turbulence reduction devices. Turbidity of the overflow liquid was measured using a Hach turbidimeter. The retrofit clarifier operated throughout the grinding season, with the exception of some mechanical shutdowns. The retrofit clarifier was one of three clarifiers run in parallel for comparison, the other two being an unmodified 6 m diameter Graver clarifier, and an unmodified 10 m diameter Dorr clarifier. This sugar cane grinding season was characterized by very high mud levels (~12-15%), resulting from high rainfall. The Dorr clarifier had to be shut down for a few days at one point, which placed an additional load on the two remaining clarifiers. The retrofitted clarifier performed well above expected capacity with low juice turbidity, even at the higher loads. Later, the retrofitted clarifier was shut down for about 10 days due to mechanical problems unrelated to the design of the novel turbulence reduction device. The retrofitted clarifier provided better juice turbidity than the Dorr clarifier (by ~20-25%), despite having only half the residence time. As compared to the conventional Graver clarifier, the turbidity of the clarified juice was also superior, even at higher liquid loading. Our measurements showed that once the solids and liquids had been separated, thereafter the height at which liquid was collected above the distributors did not seem to be particularly significant in the absence of turbulent eddies. Thus, due to the absence of turbulence, the clarifier height can be reduced without reducing clarifier performance, perhaps by ~1.5 m. By reducing clarifier height, a further reduction in residence time can be achieved, perhaps ~20-25%, with a corresponding reduction in cost. Low residence time also helps reduce bacterial contamination and helps reduce thermal degradation of key components (e.g., sugar).

Possible applications for the novel device include any type of solid-liquid separation process that would otherwise have a transition from a highly turbulent flow to an essentially laminar stream. Examples include clarifiers in the potable water and wastewater industries, sugar industry, mining industries, biomass separations, bio-refining applications, etc.

The device may be used to reduce turbulence in either single-phase flow or multiple-phase flow. In a single-phase flow it could be used with various liquid distribution apparatus, e.g. in ion exchange vessels, where it is desired to rapidly reduce turbulence within a liquid.

In a two-phase flow (solid-liquid) apparatus, such as a clarifier, simply increasing the inlet pipe diameter to slow the velocity of the liquid exiting the pipe can cause unwanted, early separation of two phases, and can cause plugging or scaling in the inlet pipes. With the novel device the velocity in the feed pipe can be kept relatively high, to inhibit premature solid-liquid separation and consequent plugging. The device allows turbulence to be essentially eliminated before liquid exits the device.

Preferred or optional characteristics for devices in accordance with the present invention include the following:

The distance between opposing deflection baffles, D, is at least equal to, and is preferably larger than the diameter, d, of the flow inlet.

An additional set of baffles may optionally be added to the first (upper) plate to redirect flow back towards the second (lower) plate.

The configuration of the first and second plates may, for example, be circular, square, square with cut corners, or other symmetrical shape.

The height of the deflection baffles on the second (lower) plate is preferably between ~10 and ~60% of the distance between the first and second plates.

The height of the optional deflection baffles on the first (upper) plate is preferably between ~10 and ~60% of the distance between the first and second plates.

Openings between adjacent deflection baffles are preferred, to provide drainage, to avoid plugging, and to help inhibit the formation of vortices.

The distance by which the inlet pipe protrudes through the first plate should be ~50% or less of the distance between the first and second plates. While the exit of the pipe may optionally be flush with the first plate, it is preferred that the exit of the pipe should extend into the space between the first and second plates.

An optional "lip" baffle may be added around the periphery of the first (top) plate, the second (bottom) plate, or both to further reduce turbulence. The height of such an optional lip baffle should not exceed ~20% of the distance between the plates.

The turbulence reduction device should be positioned between the lower fifth and the lower half, preferably about the lower third of the liquid in the clarifier, to allow space for sediment settling and thickening.

In most applications, the device should be located above the level of sediment (mud) in the tank. In some applications, however, it is preferred to position the device under the mud level (for example, in some water treatment applications, although not recommended for clarifying sugar cane juice). The latter may be done without jeopardizing the overflow water quality.

Fluid velocity in the feed channels should remain sufficiently high to minimize potential plugging and scaling.

Liquid overflow should be collected through a series of uniformly distributed outlets at the top portion of the clarifier.

Optimal values for the several parameters may readily be determined by routine testing, and will in general be functions of the inlet velocity, the inlet diameter, the viscosity of the fluid, the particle size distribution and density, and the particular purpose for which the device is being used.

Optional connectors or spacers are preferably used to position the parallel plates more-or-less fixed relative to one another. The spacers may, for example be flat sheets, round pipes, rods, or dowels.

The first and second plates should be parallel to one another, and may be square, round, or other shape, preferably symmetric; with the axis of the inlet parallel to (and preferably coinciding with) the center of symmetry of the parallel plates. The first and second plates are preferably positioned horizontally, but may also be positioned in other orientations as well.

In an alternative design, the inlet pipes are arranged in a fractal pattern to provide hydraulically equivalent pathways from a common header. A fractal fluid distribution network inside the vessel introduces fluid through a series of hydraulically uniform pathways, where the endpoints of the pathways are distributed uniformly across the cross-section of the vessel. Each endpoint can be outfitted with an embodiment of the novel turbulence reduction device. This design allows for reduction of the turbulence within a vessel by minimizing the momentum of liquid jets at entry into the vessel. The number and spacing of endpoints can be optimized for particular applications; in the embodiment of Example 3, there was one endpoint supplying liquid per approximately each 4 m$^2$ of cross-sectional area of the clarifier.

The disclosures of all cited references are hereby incorporated by reference, in their entirety, as is the complete disclosure of the priority application, U.S. provisional patent application Ser. No. 61/244,947. The present disclosure shall take precedence in the event of a conflict.

What is claimed:

1. Apparatus for reducing the turbulence otherwise associated with the flow of a first liquid, from a pipe or hose and into a second liquid within a vessel; wherein said apparatus is adapted to be submerged within the second liquid; wherein the first and second liquids may be the same or different; and wherein said apparatus comprises:
   (a) first and second rigid plates, wherein said first and second plates are about the same size and shape, except that said first plate incorporates a central hole through which the pipe or hose may pass, so that the pipe or hose is positioned to discharge the first liquid into the space between said first and second plates;
   (b) one or more spacers, wherein each said spacer is attached both to said first plate and to said second plate, wherein said spacers hold said first and second plates in a fixed position relative to one another and parallel to one another;
   (c) at least four baffles rigidly affixed to said second plate; wherein said baffles are positioned symmetrically relative to the axis that passes through the center of the hole in said first plate and that is also perpendicular to both said plates; and wherein spaces are present between adjacent baffles to allow some liquid to pass between adjacent baffles;
wherein said apparatus is adapted for use as follows:
   (d) when the first liquid exits the pipe or hose, the first liquid impinges upon said second plate; said second plate diverts the flow of the first liquid by about 90 degrees, from an approximately linear flow that is approximately parallel to the axis, into a radially outward flow that is approximately parallel to said second plate; and then, when the radially-outwardly-flowing first liquid impinges upon said baffles, said baffles further disperse the energy of the flow of the first liquid; so that, when the first liquid exits the space between said first and second plates, there is essentially no turbulence in the first liquid, and there is essentially no turbulence at the interface between the first and second liquids; and wherein the spaces between adjacent baffles inhibit the formation of any vortices that would otherwise tend to form within a hypothetical, otherwise-identical apparatus in which said adjacent baffles were contiguous to one another, without spaces between adjacent baffles.

2. A device comprising a plurality of apparatuses as in claim 1, a pre-distributor, and a pipe or hose connecting each said apparatus to said pre-distributor; wherein said pre-distributor is adapted to distribute the first liquid uniformly to each said apparatus; and wherein said device is adapted to submerge each said apparatus within the second liquid in a single vessel.

3. Apparatus as in claim 1, wherein the distance between opposing said baffles is larger than the diameter of the central hole in said first plate.

4. Apparatus as in claim 1, wherein there are four said baffles, and wherein said baffles are arranged in a square configuration with spaces between said baffles at the each of the corners of the square.

5. Apparatus as in claim 1, wherein the height of said baffles is between 10% and 60% of the distance between said first and second plates.

6. Apparatus as in claim 1, wherein said first and second plates are circular, square, or square with truncated corners.

7. Apparatus as in claim 1, additionally comprising a pipe or hose passing through the central hole in said first plate, and adapted to discharge the first liquid into the space between said first and second plates, wherein the discharge location is closer to said first plate than to said second plate.

8. A method for introducing a first liquid into a second liquid, wherein the first liquid and the second liquid may be the same or different; said method comprising introducing the first liquid through a pipe or hose into the apparatus of claim 1, wherein the apparatus is submerged in the second liquid within a vessel; and wherein the first liquid is introduced into the second liquid with essentially no turbulence.

9. The method of claim 8, wherein the first liquid contains suspended solid particles; wherein the vessel is a clarifier adapted to allow the solid particles to settle from suspension and to separate the solid particles from the liquids; and wherein the solid particles separate from the liquids substantially faster than solid particles would separate from liquids in a hypothetical, otherwise-identical vessel in which the first liquid is introduced through a pipe or hose directly into the vessel and without the turbulence-reduction apparatus.

10. The method of claim 9, wherein the apparatus is located between the lower fifth and the lower half of the second liquid within the vessel.

11. The method of claim 9, wherein the apparatus is located above the level of the accumulating solid particles on the bottom of the vessel.

12. The method of claim 9, wherein the apparatus is located within the accumulating solid particles on the bottom of the vessel.

13. The method of claim 9, wherein the velocity of flow of the first liquid through the pipe or hose is sufficiently high to inhibit plugging or scaling of the pipe or hose, or to inhibit plugging or scaling of the apparatus, or both.

14. The method of claim 9, additionally comprising collecting clarified liquid from a plurality of uniformly-spaced, overflow outlets located at the top of the vessel.

15. The method of claim 9, wherein the first liquid comprises sugar cane juice; wherein the second liquid comprises clarified or partially-clarified sugar cane juice; wherein the solid particles comprise dirt, sand, or mud that had formerly adhered to harvested sugar cane; and wherein said method is used to remove or to substantially reduce the levels of dirt, sand, or mud suspended in the juice.

16. The method of claim 9, wherein the first liquid comprises sugar beet juice; wherein the second liquid comprises clarified or partially-clarified sugar beet juice; wherein the solid particles comprise dirt, sand, or mud that had formerly adhered to harvested sugar beets; and wherein said method is used to remove or to substantially reduce the levels of dirt, sand, or mud suspended in the juice.

* * * * *